United States Patent
Wörsdörfer

[11] Patent Number: 6,007,161
[45] Date of Patent: Dec. 28, 1999

[54] ELECTRONICALLY CONTROLLABLE BRAKE OPERATION SYSTEM

[75] Inventor: Karl-Fr. Wörsdörfer, Budenheim, Germany

[73] Assignee: ITT Manufacturing Enterprises Inc., Wilmington, Del.

[21] Appl. No.: 09/051,271
[22] PCT Filed: Oct. 9, 1996
[86] PCT No.: PCT/EP96/04366
  § 371 Date: May 18, 1998
  § 102(e) Date: May 18, 1998
[87] PCT Pub. No.: WO97/13672
  PCT Pub. Date: Apr. 17, 1997
[51] Int. Cl.[6] .................................................. B60T 8/42
[52] U.S. Cl. ............................ 303/115.2; 303/116.4; 303/DIG. 11
[58] Field of Search ............................ 303/115.2, 116.2, 303/116.4, 119.1, 114.1, 115.1, DIG. 11

[56] References Cited

U.S. PATENT DOCUMENTS

| | | | |
|---|---|---|---|
| 4,730,877 | 3/1988 | Seibert et al. | 303/52 |
| 4,950,028 | 8/1990 | Harrison | 303/115.2 |
| 5,302,008 | 4/1994 | Miyake et al. | 303/115.2 |
| 5,312,172 | 5/1994 | Takeuchi | 303/115.2 |
| 5,544,948 | 8/1996 | Schmidt et al. | 303/9 |
| 5,758,930 | 6/1998 | Schiel et al. | 303/115.2 |
| 5,806,939 | 9/1998 | Feigel et al. | 303/115.1 |
| 5,836,659 | 11/1998 | Feigel et al. | 303/115.2 |

FOREIGN PATENT DOCUMENTS

| | | |
|---|---|---|
| 0420484 | 4/1991 | European Pat. Off. . |
| 3124755 | 1/1983 | Germany . |
| 3131856 | 2/1983 | Germany . |
| 3526556 | 1/1987 | Germany . |
| 3812830 | 7/1989 | Germany . |
| 3926244 | 2/1991 | Germany . |
| 4401524 | 8/1995 | Germany . |
| 4426682 | 2/1996 | Germany . |

*Primary Examiner*—Robert J. Oberleitner
*Assistant Examiner*—Thomas J. Williams
*Attorney, Agent, or Firm*—Rader, Fishman & Grauer PLLC

[57] ABSTRACT

An electronically controllable brake actuation system for automotive vehicles includes a master brake cylinder, a simulator interacting with the master brake cylinder, a pressure source drivable by an electric control unit and by which wheel brakes of the vehicle are pressurizable, the wheel brakes being connectable to the master brake cylinder by at least one hydraulic connection that is closable by a separating valve, a device for the identification of the driver's wish for deceleration, each one inlet and outlet valve connected upstream or, respectively, downstream of the wheel brakes, and wheel sensors sensing the rotational behavior of the vehicle wheels. To improve the meterability of braking pressure of a system of the above type, especially in the range of low pressure values, the pressure source is configured as at least one continuously adjustable piston-and-cylinder assembly having a pressure chamber to which the wheel brakes are connected by the intermediary of the inlet valves.

9 Claims, 1 Drawing Sheet

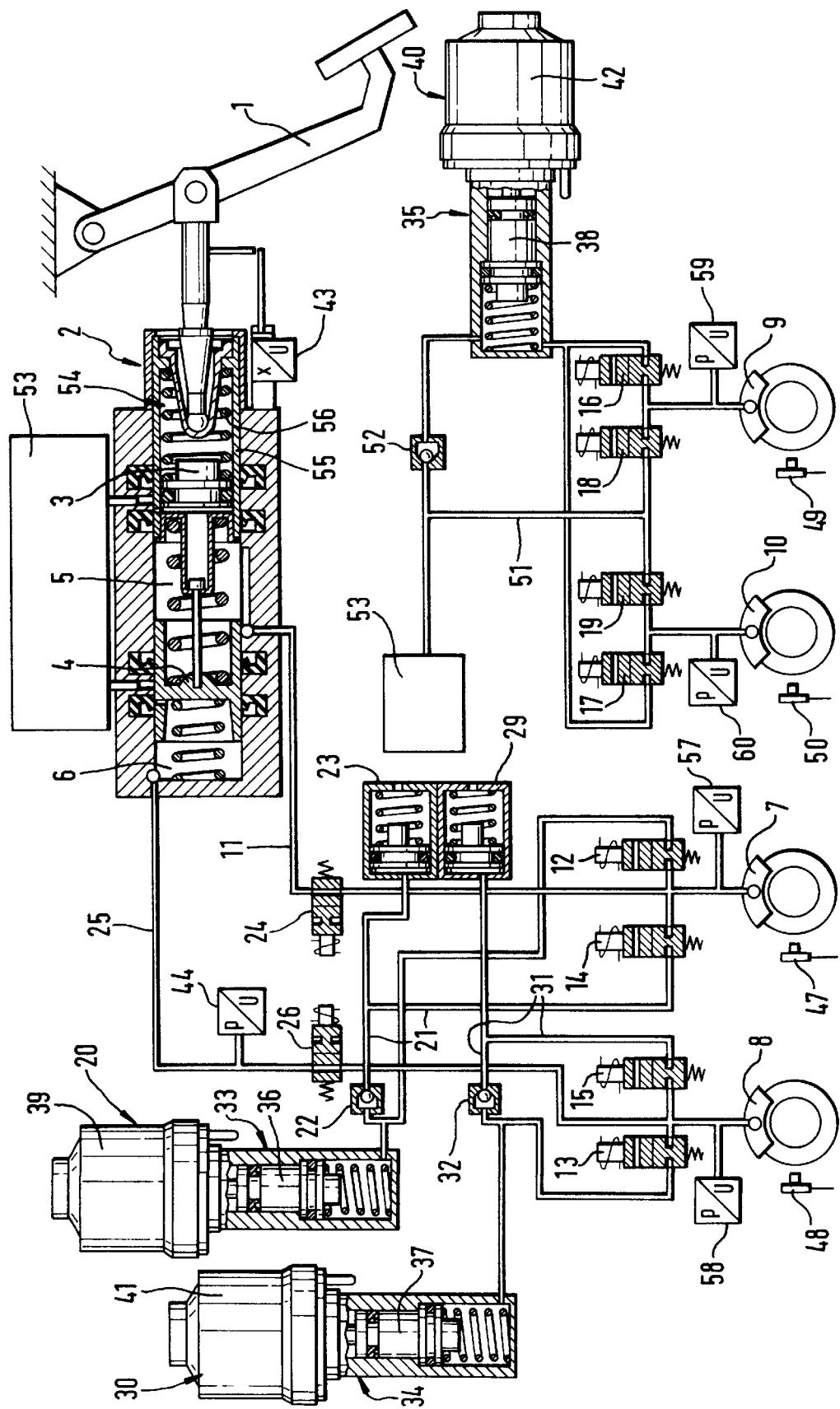

ELECTRONICALLY CONTROLLABLE BRAKE OPERATION SYSTEM

BACKGROUND OF THE INVENTION

The present invention relates to an electronically controllable brake actuation system of the type as it is disclosed in German patent application No. 31 24 755. The pressure source of the prior art brake actuation system includes a pump, a hydraulic accumulator and a pressure fluid supply reservoir. The function of the separating valves and the inlet and outlet valves is performed by multi-position valves or four-way/four-position directional control valves having inlet ports that are connected to the pressure side of the pump or the accumulator, the pressure fluid supply reservoir and each one pressure chamber of the dual-circuit master brake cylinder. The wheel brakes are connected to the outlet ports. During independent braking or pressure increase, the four-way/four-position directional control valve is switched to its first operating position where the wheel brakes are separated from the master brake cylinder and connected to the pressure source. A phase where the pressure is maintained constant is achieved in a second operating position where the wheel brakes are isolated from the master brake cylinder and from the pressure source. Pressure decrease is effected in a third operating position where a connection is provided between the wheel brakes and the unpressurized pressure fluid supply reservoir.

Apart from the comparatively high costs incurred by the use of the sophisticated pressure source, the meterability of braking pressure in the prior art brake actuation system is a disadvantage, especially in the low-pressure range, which is due to the use of the four-way/four-position directional control valves.

Therefore, an object of the present invention is to improve upon an electronically controllable brake actuation system of the above-mentioned type to such effect as to virtually eliminate the shortcomings mentioned with respect to ABS control. More particularly, the objective is to considerably improve the meterability of braking pressure in the low-pressure range and to additionally reduce the total effort and structure.

SUMMARY OF THE INVENTION

According to the present invention, this object is achieved because the pressure source is configured as at least one continuously adjustable piston-and-cylinder assembly having a pressure chamber to which the wheel brakes are connected by the intermediary of the inlet valves. It is achieved by these provisions that normal braking operations are carried out similarly by way of the piston-and-cylinder assembly, and an increase in the speed of braking pressure reduction can be achieved by an operation of the separating valves.

The present invention will be explained in detail in the following description of an embodiment, making reference to the accompanying drawing.

BRIEF DESCRIPTION OF THE DRAWING

In the drawing, the only FIGURE shows a simplified wiring diagram of the brake actuation system of the present invention.

The electronically controllable brake actuation system of the present invention shown in the drawing is intended for use in a front-wheel driven vehicle. The system includes a dual-circuit master brake cylinder or tandem master cylinder 2 operable by an actuating pedal 1. The tandem master cylinder 2 has pressure chambers 5, 6 separated from each other, confined by two pistons 3, 4 and being in connection to an unpressurized pressure fluid supply reservoir 53. The first pressure chamber (primary pressure chamber) 5 is connected to a hydraulic wheel brake 7 associated with the driven front axle of the vehicle by way of a closable first hydraulic line 11. On the other hand, wheel brake 7 is connected to a first one-circuit piston-and-cylinder assembly 20 by way of an electromagnetically operable, preferably normally closed (NC) inlet valve 12. A first low-pressure accumulator 23 is connected to a second line portion 21 between the first piston-and-cylinder assembly 20 and the wheel brake 7, wherein a first non-return valve 22 that opens towards the piston-and-cylinder assembly 20 and an electromagnetically operable, normally closed (NC) first outlet valve 14 are inserted. The hydraulic line 11 is closed by way of an electromagnetically operable first separating valve 24 that is preferably configured as a normally open (NO) two-way/two-position directional control valve.

The second pressure chamber (secondary pressure chamber) 6 of the master brake cylinder 2 is connected to the other wheel brake 8, associated with the front axle, by way of a second hydraulic line 25 that is adapted to be closed by a second separating valve 26. Wheel brake 8, on the other hand, is connected to a second one-circuit piston-and-cylinder assembly 30 by way of an electromagnetically operable, preferably normally closed (NC) second inlet valve 13. A second low-pressure accumulator 29 is connected to a second line portion 31 between the second piston-and-cylinder assembly 30 and the wheel brake 8. Line portion 31 includes a second non-return valve 32 that opens towards the piston-and-cylinder assembly 30 and an electromagnetically operable, normally closed (NC) second outlet valve 15. The above-mentioned second separating valve 26 is configured as an electromagnetically operable, normally open (NO) two-way/two-position directional control valve.

The two hydraulic wheel brakes 9, 10 that are associated with the non-driven rear axle are connected to a third piston-and-cylinder assembly 40 by way of further inlet and outlet valves 16, 17, 18, 19. The reduction of the hydraulic pressure introduced into the wheel brakes 9, 10 is carried out in a line portion 51 to which the outlet valves 18, 19 are connected. Line portion 51 is connected to the third piston-and-cylinder assembly 40 by way of a third non-return valve 52, on the one hand, and, on the other hand, to an unpressurized pressure fluid supply reservoir, for example, the above-mentioned pressure fluid supply reservoir 53. The three piston-and-cylinder assemblies 20, 30, 40 have a similar design, each including a hydraulic cylinder 33, 34, 35 wherein a piston 36, 37, 38 is slidable and can be driven by a preferably reversible direct-current motor 39, 41, 42. An electronic control unit (not shown) is used for the joint actuation of the direct-current motors 39, 41, 42 and the electromagnetic valves. Output signals of an actuating travel sensor 43, interacting with the actuating pedal 1, and of a pressure sensor 44, which senses the hydraulic pressure prevailing in the second pressure chamber 6 of the master brake cylinder 2, are sent as input signals to the control unit. The signals permit identification of the driver's wish for deceleration. However, other means, such as a force sensor sensing the actuating force on the actuating pedal 1, may also be used for the identification of the driver's wish for deceleration. Output signals of wheel sensors 47, 48, 49, 50, representative of the vehicle speed, and output signals of pressure sensors 57, 58, 59, 60 that sense the pressure values of the individual wheel brakes 7 to 10 are sent as further input variables to the electronic control unit.

As can be seen in the drawing, a simulator 54 is interposed in terms of effect between the actuating pedal 1 and the master brake cylinder 2. Simulator 54 includes a sleeve 55, which is in a force-transmitting connection to the actuating pedal 1 and forms a component of the first master cylinder piston 3, and a simulator spring 56 arranged inside the sleeve 55. The simulator spring 56 is axially supported on the piston 3, on the one hand, and on the sleeve 55, on the other hand.

The operation of the brake actuation system of the present invention shown in the accompanying drawing is as follows.

When a braking operation is initiated by depression of the brake actuating pedal 1, the actuating condition is identified by the actuating travel sensor 43 and advised to the electronic control unit. Control signals of the control unit cause change-over of the separating valves 24 and 26 and the inlet valves 12, 13, 16, 17 and thereby separation of the master cylinder pressure chambers 5, 6 from the wheel brakes 7, 8 or release of the connections between the wheel brakes 7 to 10 and the associated piston-and-cylinder assemblies 20, 30 and 40. The driver's wish for deceleration is signalled a second time by the pressure sensor 44 to the electronic control unit that, along with the brake force distribution installed in the unit, calculates the desired brake torques on the vehicle axles. The control signals corresponding to the calculated brake torques are sent in d-c motors 39, 41, 42 to the piston-and-cylinder assemblies 20, 30, 40 that initiate displacement of the pistons 36, 37, 38 in the actuating direction and, thus, pressure increase in the wheel brakes 7 to 10. The usual pedal feel that can be sensed by the driver during a braking operation is ensured by the compression of the simulator spring 56.

Pressure is reduced by the return movement of the pistons 36, 37, 38, possibly by an active reversal of the direction of rotation of the direct-current motors 39, 41, 42. The dynamics of the braking operation is augmented by the last-mentioned measure. A pressure-retaining phase is achieved by change-over of the inlet valves 12, 13, 16, 17 to their closed position.

In an ABS control operation, a simple pressure modulation (at low pressure gradients) can be performed by piston-and-cylinder assemblies exactly as in the normal braking function. A quick pressure modulation on the wheel being controlled is carried out by way of the inlet valves 12, 13, 16, 17 and outlet valves 14, 15, 18, 19. The low-pressure accumulators 23, 29 are evacuated by way of the non-return valves 22, 32 due to the resetting movement of the piston-and-cylinder assemblies 20, 30, or the third piston-and-cylinder assembly 40 takes up the pressure fluid volume again that was discharged from the wheel brakes 9, 10 into the pressure fluid supply reservoir 53.

Thus, ABS control is performed in a three-channel fashion (front axle —two-channel fashion, rear axle —one-channel fashion) in the control mode by the wheel speed sensors 47, 48, 49, 50. The braking pressure modulation on the rear axle, for example, is performed according to the 'select-low' principle.

All valves will become deenergized upon failure of the electronics/vehicle electrical system. Both wheel brakes 7, 8 associated with the front axle are connected to the tandem master cylinder 2 by way of the normally open valves 24, 26 so that the provisions mandated by law for failure of the electronic system are satisfied.

Upon hydraulic failure of the brake circuits associated with the front axle, the brake effect 'brake-by-wire' mandated by law can always be achieved by the circuit which is associated with the rear axle. Upon failure of the hydraulic circuit associated with the rear axle, it is ensured by the use of the actuating travel sensor 43 or the pressure sensor 44 that the 'brake-by-wire' brake effect is achieved by way of the driven front axle.

It should be also noted that various structures of connecting pressure chambers to brakes are possible based on the principles of the present invention and with no departing from the scope thereof. For example, where the piston-and-cylinder assembly has a dualcircuit design, one of two wheel brakes associated with a first vehicle axle and one of two wheel brakes associated with a second vehicle axle can be connected to the first pressure chamber, whereas the other wheel brake of the first and the other wheel brake of the second vehicle axle can be connected to the second pressure chamber. Or, the wheel brakes associated with one vehicle axle can be connected to the first pressure chamber, whereas the wheel brakes associated with the second vehicle axle can be connected to the second pressure chamber.

Similarly, where the pressure source is provided by a first and a second one-circuit piston-and-cylinder assembly, one of two wheel brakes associated with a first vehicle axle and one of two wheel brakes associated with a second vehicle axle can be connected to the first piston-and-cylinder assembly, whereas the other wheel brake of the first and the other wheel brake of the second vehicle axle can connected to the second piston-and-cylinder assembly.

The piston-and-cylinder assembly can be alternatively represented by a hydraulic cylinder having a piston that is operable by a valve-controlled, pneumatically or hydraulically actuatable linear drive.

I claim:

1. An electronically controllable brake actuation system for automotive vehicles with a plurality of wheels. which system includes a pedal-actuated master brake cylinder, a simulator interacting with the master brake cylinder. a plurality of wheel brakes connectable to the master brake cylinder by at least one hydraulic connection that is closable by a separating valve, a pressure source that is actuatable by an electronic control unit and by which the wheel brakes are pressurizable, a device for the identification of characteristics of a pedal actuation. wherein the pressure source is configured as at least one continuously adjustable piston-and-cylinder assembly having a pressure chamber to which the wheel brakes are connected by the intermediary of inlet valves. wherein the pressure chamber of the piston-and-cylinder assembly is connected to a low-pressure accumulator by way of a non-return valve which opens towards the pressure chamber, the wheel brake being connectable to the accumulator by way of an outlet valve, wherein both the inlet valve and the outlet valve are configured as electromagnetically operable, normally closed two-way/two-position directional control valves.

2. The electronically controllable brake actuation system as claimed in claim 1, wherein the wheel brakes of a driven vehicle axle are each connected to a pressure chamber of the master brake cylinder and a one-circuit piston-and-cylinder assembly, and the wheel brakes associated with a non-driven vehicle axle are connected only to a piston-and-cylinder assembly.

3. The electronically controllable brake actuation system as claimed in claim 1, wherein the piston-and-cylinder assembly has a dual-circuit design with a first and a second pressure chamber, wherein one of two wheel brakes associated with a first vehicle axle and one of two wheel brakes associated with a second vehicle axle are connected to the first pressure chamber, and the other wheel brake of the first and the other wheel brake of the second vehicle axle are connected to the second pressure chamber.

4. The electronically controllable brake actuation system as claimed in claim 1, wherein the pressure source is provided by a first and a second one-circuit piston-and-cylinder assembly, wherein one of two wheel brakes associated with a first vehicle axle and one of two wheel brakes associated with a second vehicle axle are is connected to the first piston-and-cylinder assembly, and the other wheel brake of the first and the other wheel brake of the second vehicle axle are connected to the second piston-andcylinder assembly.

5. The electronically controllable brake actuation system as claimed in claim 1, wherein the piston-and-cylinder assembly has a dual-circuit design with a first and a second pressure chamber, wherein the wheel brakes associated with one vehicle axle are connected to the first pressure chamber and the wheel brakes associated with a second vehicle axle are connected to the second pressure chamber.

6. The electronically controllable brake actuation system as claimed in claim 1, wherein the piston-and-cylinder assembly is provided by a hydraulic cylinder having a piston that is operable by a reversible direct-current motor.

7. The electronically controllable brake actuation system as claimed in claim 1, wherein the piston-and-cylinder assembly is provided by a hydraulic cylinder having a piston that is operable by a valve-controlled, pneumatically or hydraulically actuatable linear drive.

8. The electronically controllable brake actuation system as claimed in claim 1, wherein the master brake cylinder is operable by an actuating pedal, wherein the device for identifying the characteristics of a pedal actuation is provided by the combination of a travel sensor, which senses the actuating travel of the actuating pedal, and a pressure sensor which senses the hydraulic pressure that develops in the master brake cylinder.

9. The electronically controllable brake actuation system as claimed in claim 1, wherein the simulator is provided by a compression spring which is arranged in terms of effect between the actuating pedal and the master brake cylinder.

* * * * *